US010825054B2

(12) United States Patent
Austin et al.

(10) Patent No.: US 10,825,054 B2
(45) Date of Patent: Nov. 3, 2020

(54) METHOD AND APPARATUS FOR PROVIDING NETWORK INFORMATION

(71) Applicants: AT&T INTELLECTUAL PROPERTY I, LP, Atlanta, GA (US); AT&T MOBILITY II LLC, Atlanta, GA (US)

(72) Inventors: Mark Austin, Allen, TX (US); Sheldon Kent Meredith, Roswell, GA (US); R. Blair Bardwell, Frisco, TX (US); Andrew Jones, III, Austin, TX (US); Christopher Parsons, Dallas, TX (US)

(73) Assignees: AT&T Intellectual Property I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 601 days.

(21) Appl. No.: 15/088,886

(22) Filed: Apr. 1, 2016

(65) Prior Publication Data
US 2017/0287009 A1 Oct. 5, 2017

(51) Int. Cl.
G06Q 30/02 (2012.01)
H04W 12/00 (2009.01)
(Continued)

(52) U.S. Cl.
CPC ..... G06Q 30/0267 (2013.01); G06Q 30/0261 (2013.01); H04W 4/23 (2018.02); H04W 12/00 (2013.01); H04W 12/02 (2013.01)

(58) Field of Classification Search
CPC .................. G06Q 30/02–0277; H04L 67/147
See application file for complete search history.

(56) References Cited

U.S. PATENT DOCUMENTS 7,738,884 B2   6/2010  Cheung et al.
8,265,995 B2   9/2012  Blegen et al.
(Continued)

FOREIGN PATENT DOCUMENTS

EP   2487936 A1   8/2012
WO   2008112401   9/2008
(Continued)

OTHER PUBLICATIONS

Access. "The Rise of Mobile Tracking Headers: How Telcos Around the World are Threatening Your Privacy". Aug. 2015 [retrieved on Sep. 13, 2018]. Retrieved from Internet:< URL: https://www.ftc.gov/system/files/documents/public_comments/2015/09/00008-97486.pdf> (Year: 2015).*

(Continued)

Primary Examiner — Michael W Schmucker
Assistant Examiner — Bion A Shelden
(74) Attorney, Agent, or Firm — Guntin & Gust, PLC; Jay Anderson

(57) ABSTRACT

Aspects of the subject disclosure may include, for example, a method for processing an advertising request message, including, receiving an advertising request message from a mobile device, determining if an advertising exchange server associated with the advertising request is permitted to receive enhanced information associated with the mobile device if a service provider is permitted to provide location information associated with the mobile device responsive to determining that the advertising exchange server associated with the advertising request is permitted to receive the enhanced information, responsive to determining that the service provider is permitted to provide location information, adding location information associated with the mobile device to a header of the advertising request message, and (Continued)

transmitting the advertising request message to the advertising exchange server. Other embodiments are disclosed.

20 Claims, 7 Drawing Sheets

(51) Int. Cl.
*H04W 12/02* (2009.01)
*H04W 4/23* (2018.01)

(56) References Cited

U.S. PATENT DOCUMENTS

| | | | |
|---|---|---|---|
| 8,275,649 B2 | 9/2012 | Zheng et al. | |
| 8,862,747 B2* | 10/2014 | Shah | H04W 4/02 709/227 |
| 8,989,718 B2 | 3/2015 | Karasic et al. | |
| 8,990,107 B2 | 3/2015 | Yang et al. | |
| 9,002,730 B2 | 4/2015 | Postrel | |
| 9,008,691 B2 | 4/2015 | Busch | |
| 9,137,093 B1* | 9/2015 | Abraham | H04L 29/12009 |
| 2007/0192650 A1* | 8/2007 | Shiota | G06F 1/3203 713/600 |
| 2008/0270417 A1* | 10/2008 | Roker | G06Q 30/02 |
| 2010/0056185 A1* | 3/2010 | Lamba | G01S 5/02 455/456.6 |
| 2010/0114716 A1* | 5/2010 | Heilig | G06Q 30/02 705/14.71 |
| 2011/0218866 A1* | 9/2011 | Wilson | G06Q 30/02 705/14.73 |
| 2012/0130817 A1 | 5/2012 | Bousaleh et al. | |
| 2012/0226554 A1 | 9/2012 | Schmidt et al. | |
| 2013/0046632 A1 | 2/2013 | Grigg et al. | |
| 2013/0067213 A1* | 3/2013 | Liu | H04L 9/0819 713/150 |
| 2013/0091016 A1 | 4/2013 | Shutter et al. | |
| 2013/0115872 A1* | 5/2013 | Huang | H04W 4/06 455/3.01 |
| 2013/0217332 A1* | 8/2013 | Altman | H04H 60/90 455/41.2 |
| 2013/0246173 A1* | 9/2013 | Berkley | G06Q 30/02 705/14.53 |
| 2013/0273886 A1* | 10/2013 | Mohajeri | H04W 12/06 455/411 |
| 2013/0318346 A1* | 11/2013 | Libonate | H04L 43/16 713/168 |
| 2014/0129334 A1* | 5/2014 | Gu | G06Q 30/02 705/14.58 |
| 2014/0180822 A1* | 6/2014 | Peebles | G06Q 30/0267 705/14.64 |
| 2015/0073906 A1 | 3/2015 | Chauhan | |
| 2015/0081488 A1* | 3/2015 | Turner | G06Q 30/02 705/34 |
| 2015/0095158 A1 | 4/2015 | Nasserbakht et al. | |
| 2015/0106442 A1* | 4/2015 | Baldachin | G06F 17/30899 709/203 |
| 2015/0127460 A1 | 5/2015 | Daub et al. | |
| 2015/0186626 A1* | 7/2015 | Hinnegan | G06F 21/6245 726/28 |
| 2015/0222325 A1* | 8/2015 | Sellier | H04Q 9/00 375/133 |
| 2016/0019592 A1 | 1/2016 | Muttineni et al. | |

FOREIGN PATENT DOCUMENTS

| | | |
|---|---|---|
| WO | 2010077821 A1 | 7/2010 |
| WO | 2013107669 A1 | 7/2013 |
| WO | 2014074513 A1 | 5/2014 |
| WO | 2015184184 | 12/2015 |

OTHER PUBLICATIONS

Glanert, Martin, "AdNext: Visit-Pattern-Aware Mobile Ads," Behavioral Targeting Blog, behavioraltargeting.biz, Discloses a method of predicting the movement and location of a mobile device user based on location history of similar users., 2011.

Macissac, Tom, "The Dirty Little Secret About Location-Targeted Mobile Ads," Business Insider, businessinsider.com, Discloses a method of locating a mobile device user for targeting location-specific ads. The location maybe determined by cell towers, and the user must opt in to share location data., 2013.

Oremus, Will, "What Happens When Our Cellphones Can Predict Our Every Move?," Slate, slate.com, Discloses a method of predicting the movement and location of a mobile device user based on past location data., 2012.

Sweeney, Camille, "Do You Know Where You'll be 285 Days From Now at 2 P.M.? These Data-Masters Do," Fast Company, fastcompany.com, Discloses a method of predicting the movement and location of a mobile device user based on past location data., 2013.

* cited by examiner

100

200

METHOD AND APPARATUS FOR PROVIDING NETWORK INFORMATION

FIELD OF THE DISCLOSURE

The subject disclosure relates to a method and apparatus for providing network information.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile devices in a variety of situations. Intelligent devices offer new means for experiencing network interactions in ways that anticipate consumer desires and provide solutions to problems.

DETAILED DESCRIPTION

Figure 1:
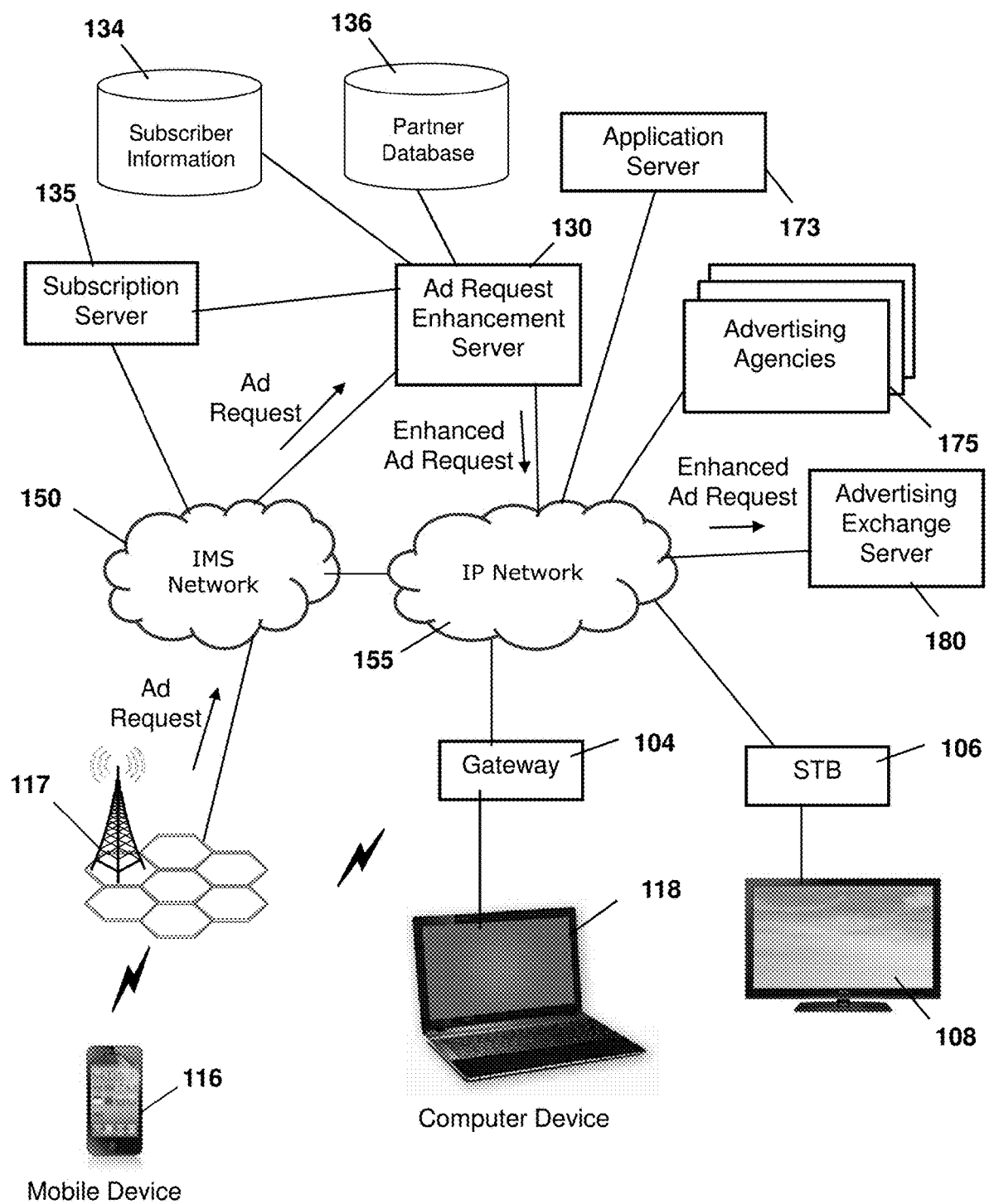
FIG. 1 depicts illustrative embodiments of a system for providing enhanced advertising request information for targeted advertising in a communication network.

The subject disclosure describes, among other things, illustrative embodiments for providing network information for use in targeting advertising for mobile devices. A telecommunication network can provide mobile communication services and access to the Internet to the mobile devices. Applications executing at the mobile devices can access information and/or media content via the mobility network. It can be economically advantageous for an application provider to present advertising content to the user, or subscriber, of the mobile device. To facilitate presentation of this advertising content, the application can send an advertising request, or, simply, an ad request, to an advertising exchange server. The ad request indicates an opportunity for the advertising exchange server to provide advertising content at the application of the mobile device. If the ad request includes pertinent information about the subscriber or the mobile device, this information can further improve the economic value of the advertising placement to the both the advertising exchange server and the application provider by providing a means for selecting advertising content that is likely to be of interest to the subscriber.

The ad request that is transmitted from the mobile device may traverse the telecommunication network that serves at the service provider for the subscribed mobile device. The telecommunication network can intercept the ad request and determine the identity of the ad exchange server to which the ad request is directed. The service provider can determine whether a special arrangement has been made for providing enhanced information to the ad exchange server. If no such arrangement is made, then the ad request can be forwarded, for example as is, to the ad exchange server. If, however, an arrangement has been made, then the service provider can add enhanced information to the ad request to better describe, for example, the subscriber, the location of usage, and/or the mobile device in ways that can allow the ad exchange server to directly or indirectly improve targeting of the advertising content. The service provider can determine the scope of information that is shared with the ad exchange server based on what the subscriber and privacy policies permit, either by direct ascent or implied ascent. The service provider can use information from its mobility network infrastructure to determine the approximate location of the mobile device. The service provider can use subscription profile information to determine demographic characteristics. The information that is obtained by the service provider can be encoded and/or encrypted to protect privacy and security. The enhanced information can be included in a modified version of the ad request that is then forwarded to the advertising exchange server. Other embodiments are described in the subject disclosure.

One or more aspects of the subject disclosure include a server device including a memory to store executable instructions and a processor communicatively coupled to the memory. The processor, responsive to executing the executable instructions, can perform operations for receiving an advertising request message from a mobile device associated with a service provider, and, in turn, identifying an advertising exchange server according to the advertising request message. The processor can also perform operations for determining whether the advertising exchange server has first permission from the service provider to receive enhanced information associated with the mobile device. Responsive to determining that the advertising exchange server has the first permission to receive the enhanced information, the processor can further perform operations for determining from a subscriber profile associated with the mobile device whether the service provider has second permission for providing location information associated with the mobile device. Responsive to determining that the service provider has the second permission, the processor can perform operations for modifying the advertising request message by accessing the location information associated with the mobile device, encrypting the location information to generate encrypted enhanced information, and, in turn, appending the encrypted enhanced information to a header of the advertising request message. The prcoessor can perform operations for transmitting the advertising request message to the advertising exchange server.

One or more aspects of the subject disclosure include a machine-readable storage medium, including executable instructions that, when executed by a processor, facilitate performance of operations, including receiving an advertising request message from a mobile device. The instructions can also facilitate performance of operations for determining whether an advertising exchange server associated with the advertising request is permitted to receive enhanced information from a service provider associated with the mobile device. Responsive to determining that the advertising exchange server is permitted to receive the enhanced information, the instructions can further facilitate performance of operations for determining whether the service provider is permitted to provide location information associated with the mobile device. Responsive to determining that the service provider is permitted to provide location information, the instructions can facilitate performance of operations for modifying the advertising request message by accessing the location information associated with the mobile device, appending the location information to a header of the advertising request message, and, in turn, transmitting the advertising request message to the advertising exchange server.

One or more aspects of the subject disclosure include a method, operating at a system comprising a processor, including receiving, by a system comprising a processor, an advertising request message from a mobile device, and, in turn, determining, by the system, if an advertising exchange server associated with the advertising request is permitted to receive enhanced information associated with the mobile device. The method can also include determining, by the system, if a service provider is permitted to provide location information associated with the mobile device responsive to determining that the advertising exchange server associated with the advertising request is permitted to receive the enhanced information. Responsive to determining that the service provider is permitted to provide location information, the method can further include adding, by the system, location information associated with the mobile device to a header of the advertising request message. The method can include transmitting, by the system, the advertising request message to the advertising exchange server.

Figure 2:
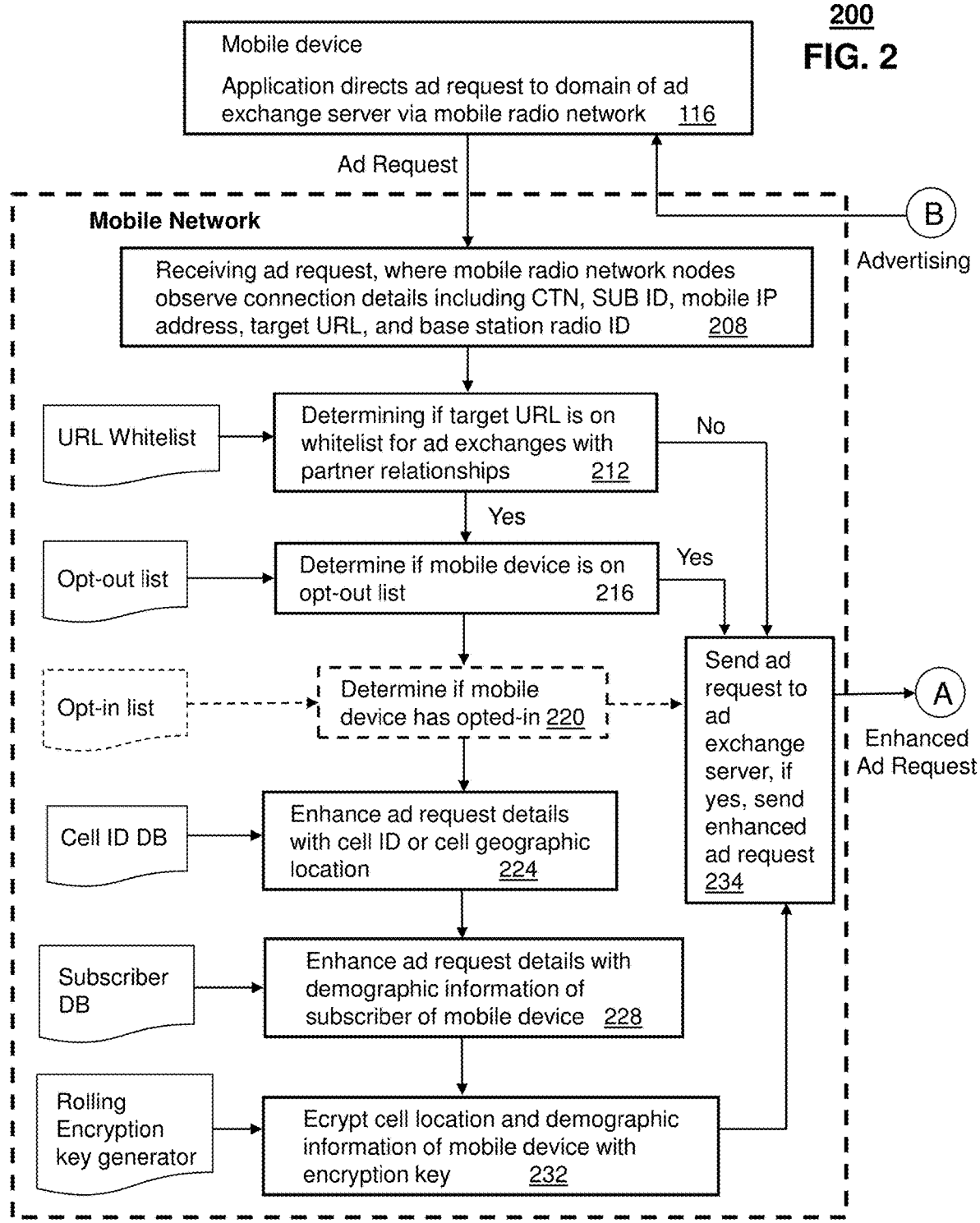
FIGS. 2-3 depict illustrative embodiments of a method used in portions of the system described in FIG. 1.

Referring now to FIGS. 1 and 2, a communication system 100 is illustrated. The system 100 can provide wireless communication services, including voice, video, data and/or messaging services to mobile communications devices 116 and other computer devices 118. The system 100 can provide wireline communication services, such as serving as an Internet Service Provider (ISP) for computer devices 118. The system 100 can provide subscription television services via wired and/or wireless communications. For example, the system 100 can provide streaming media content to a mobile device 116, via a cellular link 117, to a computer device 118, via a wired or wireless gateway 104, or to a television or monitor device 108, via a set-top box device 106. System 100 can enable wireless communication services over a number of different networks, such as between mobile devices 116 and computer devices 118. Mobile communication devices 116 can include a number of different types of devices that are capable of voice, video, data and/or messaging communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile device 116 can connect to a cellular base station 117 via a wireless communication signal. The mobile device 116 can communication, via the IMS network 150, with other mobile devices, with landline communication devices, and with an Internet Protocol (IP) network 155, such as the Internet or the world-wide web (WWW). The communication system 100 can provide communications and sharing of various resources between mobile devices 116 and various devices, such as computer devices 118, which are connected to the IP network 155.

In one or more embodiments, a mobile device 116 of the communication system 100 can load and execute an application. For example, the mobile device 116 can be preloaded with a set of applications by its manufacturer or seller. The mobile device 116 can download an application from an application server 173 via the communication network. The application may require access to content from the Internet 155, such as would be the case for an application that is used for accessing a media content site (e.g., espn-.com mobile application).

In one or more embodiments, the application can include frames or windows or other objects into which advertisements can be inserted. If execution of the application cause it to trigger an advertising event (e.g., the subscriber selects a new page of content or a video for viewing), then the application can seek an advertisement for display. In one embodiment, the application can generate an ad request message. The ad request can include an advertising identification (ad ID) that is unique for the useful life of the request. The ad request can also include a subscriber ID (SUB ID) that corresponds to the subscriber for the mobile device 116.

In one or more embodiments, the ad request enhancement server 130 can monitor for ad requests from mobile devices 116 operating on the communication network 100. If the ad request enhancement server 130 receives an ad request from a mobile device, it can inspect the ad request to determine which advertising exchange server 180 was being targeted by the ad request. In one embodiment, the ad request enhancement server 130 can determine the domain of the advertising exchange server 180 by determining a uniform resource locator (URL) which is targeted by the mobile device 116 (e.g., adexchange.com). In one or more embodiments, the ad request enhancement server 130 can compare the URL of the advertising exchange server 180 to a partner database 136 to determine if the advertising exchange server 180 has a partner relationship with the service provider of the ad request enhancement server 130. If no partner relationship exists, then the ad request message is routed to the advertising exchange server 180 without modification. When the unmodified ad request is received at the advertising exchange server 180, advertising exchange server 180 can notify its affiliated advertising agencies 175 of the ad request to allow those advertising agencies 175 to bid for the advertising spot. The advertising exchange server 180 can notify advertising agencies of information associated with the mobile device 116, such as a device identifier and/or a subscriber identifier (SUB ID). The advertising exchange server 180 can determine a winning bidder from the advertising agencies, where the winning bidder can transmit an advertising spot to the mobile device 116 via the network 100.

In one or more embodiments, if the ad request enhancement server 130 determines that it has a partner relationship with the targeted advertising exchange server 180, then the ad request enhancement server 130 can modify the ad request. In one or more embodiments, the presence of a partner relationship can represent a first level of permission required for the modifying the ad request that is sent to the advertising exchange server 180. In one embodiment, any advertising exchange server 180 can be considered a partner automatically, for purposes of receiving the enhanced ad request. In another embodiment, partner database can include only those advertising exchange servers 180 for which the service provider is not a partner. In another embodiment, the service provider can have a different levels of partnership arrangements for determining different levels of enhancement information that will be provided to the advertising exchange server 180. For example, a first level of partnership can qualify the advertising exchange server 180 to receive only location information for the mobile device, a second level qualifies for subscriber demographic information, while a third level qualifies for both types of information.

In one or more embodiments, the ad request enhancement server 130 can determine one or more subscriber permissions that are associated with the mobile device 116. The ad request enhancement server 130 can determine the subscriber identification by reading the subscriber identification from the ad request. The ad request enhancement server 130 can user the subscriber identification to search for subscriber information from a subscription server 135 and/or a subscriber information database 134. The ad request enhancement server 130 can determine whether the subscriber, who is associated with the mobile device 116, has given permission to the service provider to provide enhanced information to the advertising exchange server 180. In one embodiment, the subscriber can opt-in to providing this information to be shared. For example, the subscriber can be asked to opt-in when signing up for a service agreement. A default setting can be used by the service provider, whereby the subscriber withholds permission for sharing the enhanced information with an advertising exchange server 180 unless the subscriber gives an affirmative opt-in to sharing the information. The subscriber can be offered an incentive to provide an affirmative permission via a reward, such as free or discounted service feature. In one embodiment, a default setting can be used by the service provider, whereby the subscriber gives an implied permission for sharing of the enhanced information with the advertising exchange server 180 unless the subscriber provides an affirmative opt-out from sharing information. The use of an opt-in or an opt-out process can depend on regulatory constraints.

In one or more embodiments, if the ad request enhancement server 130 determines that the subscriber has not given permission to the service provider to share the enhanced information, then the ad request enhancement server 130 can forward the ad request to the advertising exchange server 180 without including any information regarding the mobile device 116 or the subscriber. In one embodiment, where the subscriber has not given permission, the ad request can be forwarded to the advertising exchange server 180 regardless of any partnering relationship between the subscriber and the advertising exchange server 180.

In one or more embodiments, the subscriber can provide more than one permission to the service provider. In particular, the subscriber can provide different permissions for different types of information. For example, the subscriber can provide (or withhold) a first permission for a sharing a first type of location information with the advertising exchange server 180, a second permission for sharing a second type of location information, a third permission for sharing a first type of demographic information, a fourth permission for sharing a second type of demographic information, and so. In another example, the subscriber can provide (or withhold) all types of available enhanced information based on a single opt-in or opt-out decision.

In one or more embodiments, the ad request enhancement server 130 can determine location information for the mobile device 116. The IMS network 150 can determine which cellular base station 117 is being used by the mobile device 116 for communicating with the IMS network 150. At any given time, the mobile device 116 can be communication to a specific base station 117 of the mobility network.

The ad request enhancement server 130 can receive a cell identification (Cell ID) for base station 117 from the IMS network 150. In one embodiment, the ad request enhancement server 130 can access a geographic location for the base station 117. The ad request enhancement server 130 can modify the ad request to add the location information to a modified version of the ad request that is sent to the advertising exchange server 180. The cell location can be added in one of two ways. In one embodiment, location coordinates (e.g., longitude and latitude) can be added to the ad request. In one embodiment, the cell ID can be added to the ad request. In this case, the advertising exchange server 180 can use the cell ID from the ad request to reference a lookup table of cell base station locations to determine the actual location of this particular base station. In one or more embodiments, the ad request enhancement server 130 can add the enhanced information, such as the location information, to the ad request by modifying a header section of the ad request message. In one embodiment, the location of the mobile device 116 can be reported via the ad request according to the physical geographic location of the base station 117. In one embodiment, the location of the mobile device 116 can be reported via the ad request according to a centroid of a coverage area for the cell station 117.

In one or more embodiments, the location information can be improved by including information about one or more other cellular base stations 117 other then the base station 117 that the is currently communicating with the mobile device. 116. For example, the other cellular base stations 117 can receive signals from the mobile device 116 even if they are not the primary base station for communication. In one embodiment, signal strength levels for the each base station 117 that can receive signals from the mobile device 116 can be logged. By comparing the relative base station 117 signal strength levels and triangulating between the known locations of the base stations 117, the IMS network 150 and/or the ad request enhancement server 130 can determine a more precise location for the mobile device 116.

In one or more embodiments, the location information can be improved by including information regarding how long the mobile device 116 has been communicating with the cellular base station 117. For example, the IMS network 150 and/or the ad request enhancement server 130 can access information from the cellular base station 117 to determine when the mobile device 116 first began to communicate with the cellular base station 117. The ad request enhancement server 130 can use the first communication information to determine how long the mobile device 116 has been communicating with the base station 117. The ad request enhancement server 130 can report the length of time along with the location in modified ad request.

In one or more embodiments, the location information can be improved by determining if the mobile device is coupled to a local area network (LAN). For example, the mobile device 116 can be communicating via a wireless link with a LAN that is controlled by a gateway device 104. A Wi-Fi link can be used for communication between the mobile device 116 and the gateway 104. If the ad request enhancement server 130 knows that the mobile device 116 is in communication with the gateway device 104 via a Wi-Fi link, the relatively short operating range of the Wi-Fi for the gateway device 104 can be used by the ad request enhancement server 130 to determine that the mobile device 116 is basically located at the gateway device location 104. Therefore, the ad request enhancement server 130 can report the location of the mobile device 116 as the approximate location of the gateway device 104.

In one or more embodiments, the location information can be improved by determining if the mobile device includes an operating application that detects the current global satellite position (GPS) of the mobile device. For example, the mobile device 116 can obtain its current position by receiving a GPS satellite signal and determining the current GPS longitude and latitude according to the GPS signal. The ad request enhancement server 130 can receive the GPS location from the IMS network 150 and can report the GPS information as the location of the mobile device 116 as the approximate location of the gateway device 104.

In one or more embodiments, the location information can be improved by including information regarding a direction, or vector, for the mobile device 116. Information from the other base stations 117, wireless communication information from a LAN, and/or GPS information can be used to determine if the mobile device 116 is moving. The ad request enhancement server 130 can report a direction, or vector, along with the location in modified ad request.

In one or more embodiments, subscriber information can be reported in the modified ad request. The subscriber information can obtained by the ad request enhancement server 130 from a subscriber server 135 and or a subscriber information database. The subscriber information can include demographic information about the subscriber. For example, the subscriber information can include the subscriber's age, sex, race, ethnicity, city, vocation, and/or hobby. The demographic information can be aggregated ranges or codes so that the information does not describe the subscriber too closely.

In one or more embodiments, the subscriber information can include information regarding internet search history of the subscriber and/or the mobile device 116. The ad request enhancement server 130 can obtain the search information from the mobile device 116 or from monitoring searches that are performed through the network 100. For example, am topic of a recent search or several recent searches can be included in the subscriber information. In one or more embodiments, the subscriber information can include one or more recent locations, where the mobile device has traveled. For example, the ad request enhancement server 130 can use information from prior locations of the mobile that has been captured, as described above to, to deduce a frequency of visiting the location. In one or more embodiments, the subscriber information, including subscriber profile information and/or demographic information, can be added to the header of the ad request file.

In one or more embodiments, the ad request enhancement server 130 can combine any combination of location information and/or subscriber information to create the enhanced information that is included in the ad request. In one embodiment, the enhanced information is included in a header of the ad request.

In one or more embodiments the ad request enhancement server 130 can provide a layer of security for the enhanced information by encrypting the enhanced information that is included. In one embodiment, the location information and/or the subscriber information can be encrypted before including the information as part of the header of the ad request message. In one embodiment, the each section of information is encrypted separately, while in another embodiments, the entire header and/or message is encrypted. In or more embodiments, a rolling encryption method is used wherein the key is changed according to a rolling key generator.

In one or more embodiments, the enhanced ad request is transmitted to the advertising exchange server 180 by the ad request enhancements server 130. The advertising exchange server 180 cam decrypt the enhanced ad request according to the appropriate encryption key. The advertising exchange server 180 can inform one or more advertising agencies of the available advertising spot that is open for bid. A selected advertising spot can be transmitted to the mobile device 116 via that IMS network 150.

Figure 3:
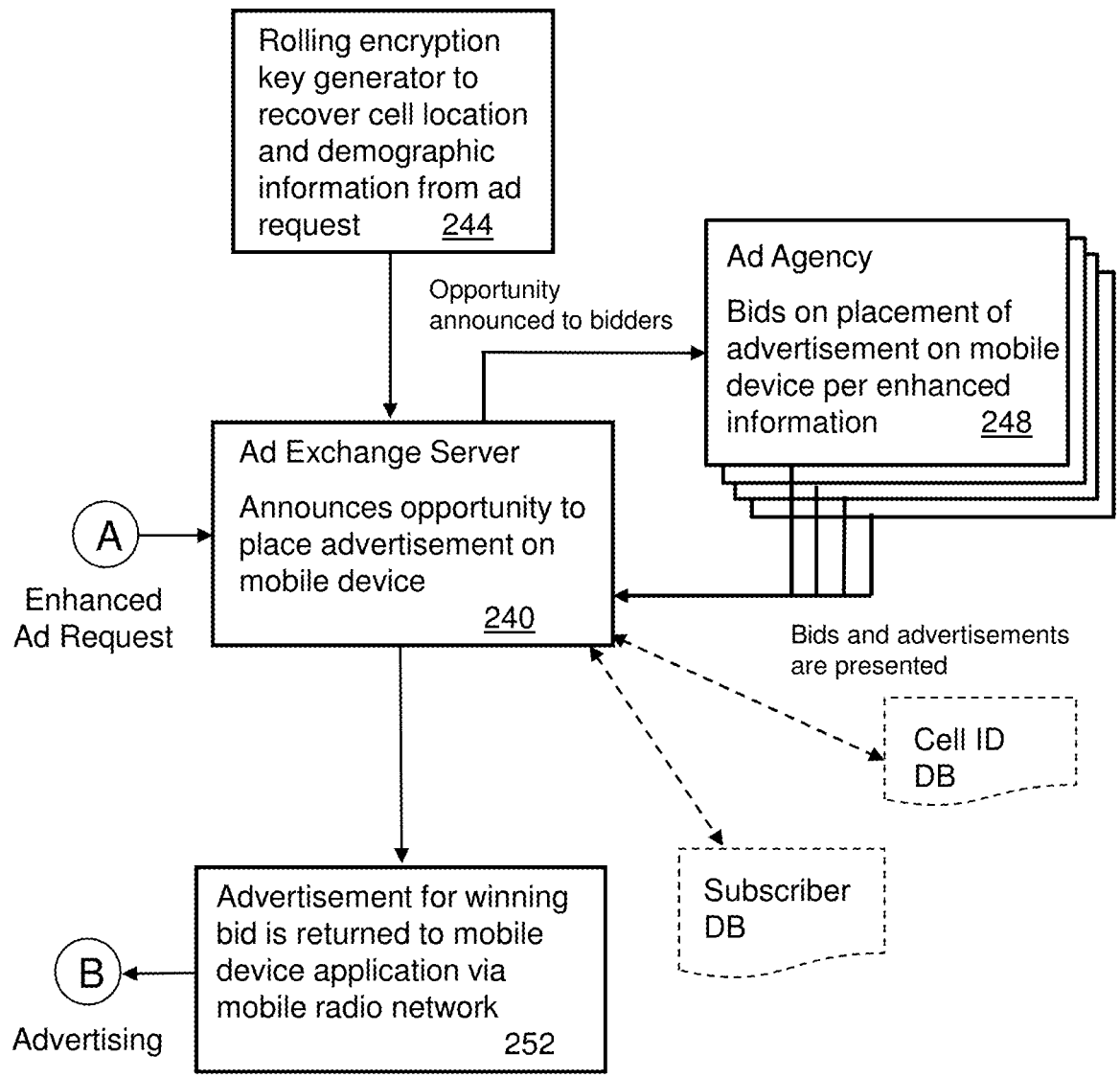

FIG. 2-3 depicts an illustrative embodiment of a method used by in portions of the system described in FIG. 1. In particular, FIGS. 2-3 shows illustrative embodiments of a method 200 for providing network information for use in targeting advertising for mobile devices.

In step 208, an ad request enhancement server can receive an ad request from a mobile device 116 by way of a communication network. The ad request can be generated by an application running at the mobile device and can be directed to a domain of an advertising exchange server. The mobile network that supports communications for the mobile device can observe connection and routing information for the mobile device, including cell telephone number (CTN), subscriber identification (SUB ID), mobile IP address, the target URL of the advertising exchange server, and the base station radio identification (cell ID).

In step 212, the ad request enhancement server can determine if the advertising exchange server is in a partner relationship with the service provider. The target URL of the advertising exchange server can be used to search a database of URLs (URL Whitelist). If the ad request enhancement server does not find the target URL on the Whitelist, then the ad request enhancement server can determine that no partnership exists and, therefore, the ad request enhancement server does not have permission to share enhanced information with the advertising exchange server. The ad request enhancement server can simply forward the ad request to the advertising exchange server, in step 234. However, if the ad request enhancement server does determine that the advertising exchange server is on the Whitelist and is permitted to receive the enhanced information, then the ad request enhancement server can proceed to step 216.

In step 216, the ad request enhancement server can determine if the mobile device is on an opt-out list. For example, the cell telephone number (CTN) can be compared to a database that includes an opt-out list. In another embodiment, a subscriber identification can be compared to the database with the opt-out list. In this case, the default setting can be for the subscriber to be presumed to have permitted sharing of enhanced information unless he/she has actively opted out. If the ad request enhancement server has determined that the subscriber has opted out, then the ad request enhancement server can simply forward the ad request to the advertising exchange server, in step 234.

In optional step 220, the ad request enhancement server can determine if the mobile device is on an opt-in list. For example, the cell telephone number (CTN) can be compared to a database that includes an opt-in list. In another embodiment, a subscriber identification can be compared to the database with the opt-in list. In this case, the default setting can be for the subscriber to be presumed to have not permitted sharing of enhanced information unless he/she has actively opted in. If the ad request enhancement server has determined that the subscriber has not opted in, then the ad request enhancement server can simply forward the ad request to the advertising exchange server, in step 234.

In step 224, the ad request enhancement server can enhance the ad request details by adding location information to the ad request. For example, the location information can be added to the header of the ad request. The ad request enhancement server can access a cell identification (Cell ID) database to determine the physical location for the Cell ID that is currently communicating with the mobile device. In one embodiment, the physical location information can be added to the ad request. In one embodiment, the Cell ID can be added to the ad request.

In step 228, the ad request enhancement server can enhance the ad request details by adding demographic information of the subscriber associated with the mobile device. The ad request enhancement server can access a subscriber database and/or a subscriber information database using the subscriber ID to retrieve demographic information. In another embodiment, the demographic information can include search information and/or location history information. In step 232, the ad request enhancement server can encrypt the location and demographic information to generate the enhanced ad request which is, in turn, sent to the ad exchange server at step 234. In one embodiment the ad request enhancement server can use a rolling encryption key to encrypt the enhanced information.

In step 240, the advertising exchange server can receive the enhanced ad request and can use a rolling encryption key generator to successfully recover (decrypt) the enhancement information from the enhanced ad request in step 244. In step 248, the advertising exchange server can send information, including the enhanced to ad agencies, which, in turn, bid on placement of advertisements at the mobile device based on the enhanced information. The winning ad agency can then provide the advertisement to the ad exchange server, which, in turn, forwards the wining advertisement to the mobile device via the mobile radio network in step 252.

While for purposes of simplicity of explanation, the respective processes are shown and described as a series of blocks in FIGS. 2-3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
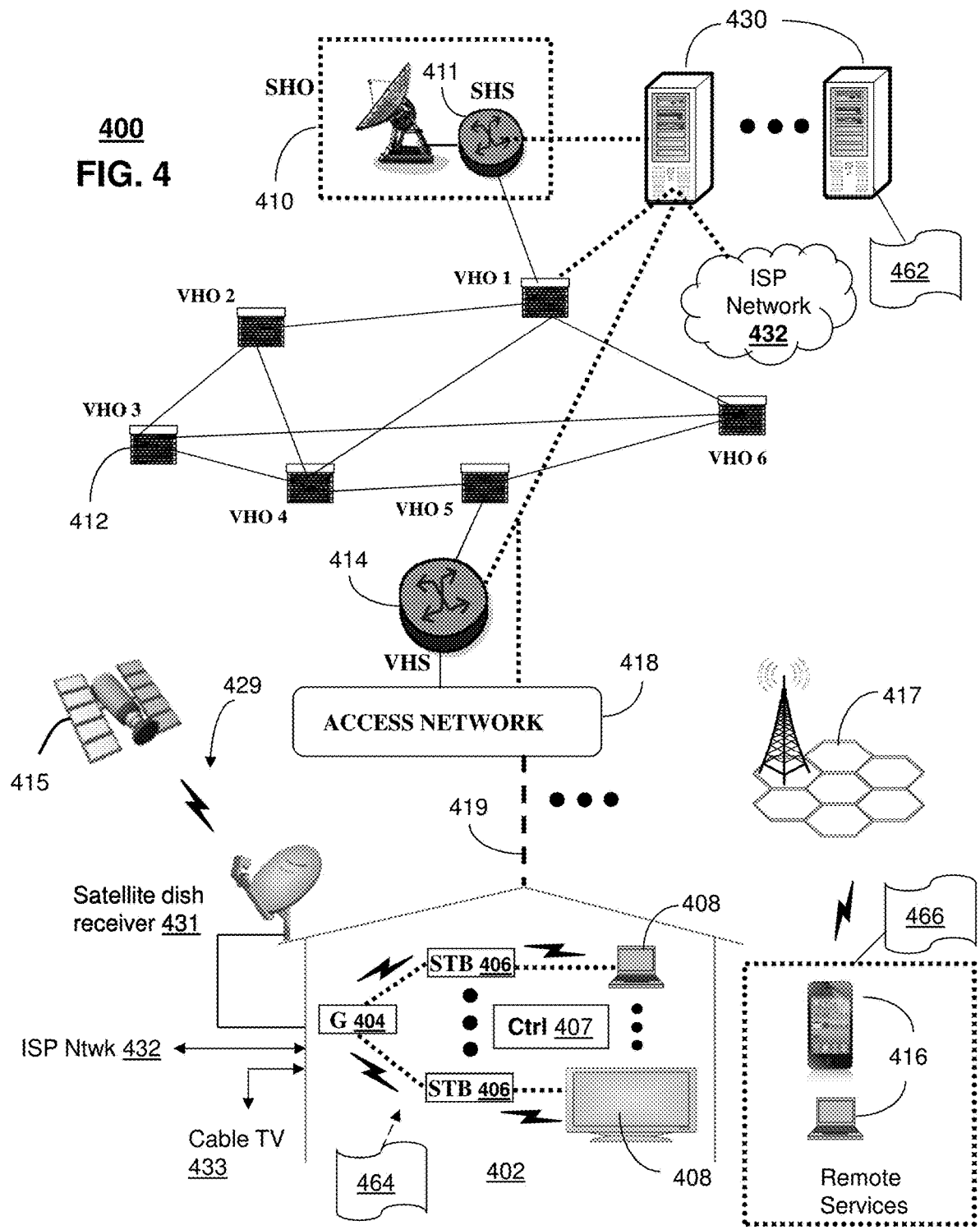
FIGS. 4-5 depict illustrative embodiments of communication systems that provide configurable event content according to the embodiments illustrated in FIG. 1.

FIG. 4 depicts an illustrative embodiment of a first communication system 400 for delivering media content. The communication system 400 can represent an interactive television network, such as an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4 for providing network information for use in targeted advertising for mobile devices. An ad request enhancement server can receive an ad request from a mobile device, determine if the service provider has permission to share location information and/or demographic information associated with the mobile device, and, if permitted, modifying the ad request to include encrypted versions of this enhanced information to generate an enhanced ad request that is sent to an advertising exchange server.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (Wi-Fi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Communication system 400 can also provide for all or a portion of the computing devices 430 to function as an ad request enhancement server 430. The ad request enhancement server 430 can use computing and communication technology to perform function 462, which can include among other things, the enhanced ad request techniques described by method 200 of FIGS. 2-3. For instance, function 462 of server 430 can be similar to the functions described for the ad request enhancement server 130 of FIG. 1 in accordance with method 200. The media processors 406 and wireless communication devices 416 can be provisioned with software functions 464 and 466, respectively, to utilize the services of ad request enhancement server 430. For instance, functions 464 and 466 of media processors 406 and wireless communication devices 416 can be similar to the functions described for the communication devices 116, 118, 106, and 108 of FIG. 1 in accordance with method 200.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. System 400 can represent any type of network that delivers media content (e.g., video and/or audio) via various techniques, such as broadcast, multicast, unicast, anycast or other delivery techniques. The media content can be scheduled programming and/or non-scheduled programming, such as VOD.

Figure 5:
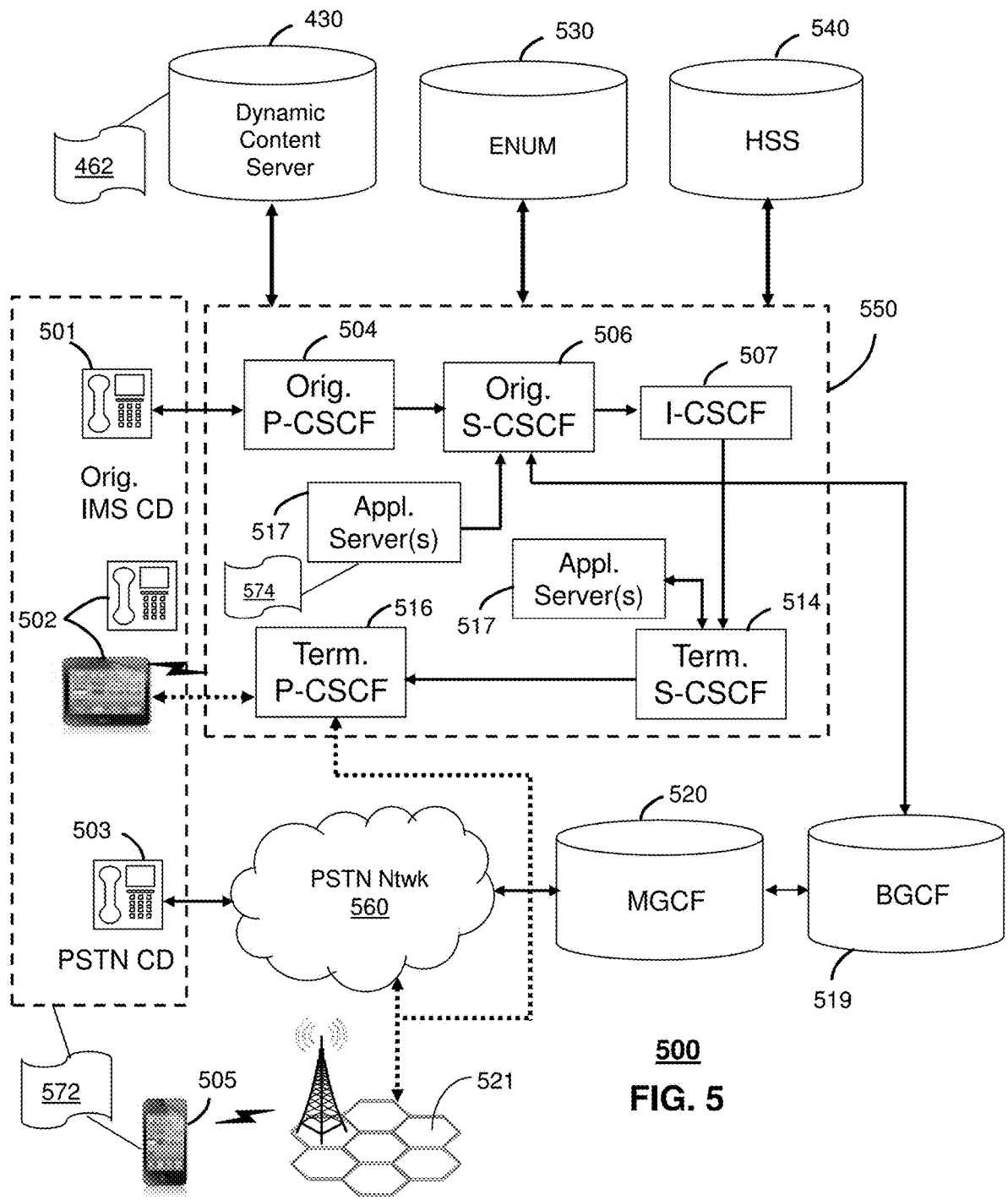

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. An ad request enhancement server can receive an ad request from a mobile device, determine if the service provider has permission to share location information and/or demographic information associated with the mobile device, and, if permitted, modifying the ad request to include encrypted versions of this enhanced information to generate an enhanced ad request that is sent to an advertising exchange server. Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a Wi-Fi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The ad request enhancement server 430 of FIG. 4 can be operably coupled to communication system 500 for purposes similar to those described above. The ad request enhancement server 430 can perform function 462 and thereby provide enhanced ad request services to the CDs 501, 502, 503 and 505 of FIG. 5 similar to the functions described for ad request enhancement server 130 of FIG. 1 in accordance with method 200 of FIGS. 2-3. CDs 501, 502, 503 and 505, which can be adapted with software to perform function 572 to utilize the services of the ad request enhancement server 430 similar to the functions described for communication devices 116, 118, 106, and 108 of FIG. 1 in accordance with method 200 of FIGS. 2-3. The ad request enhancement server 430 can be an integral part of the application servers 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
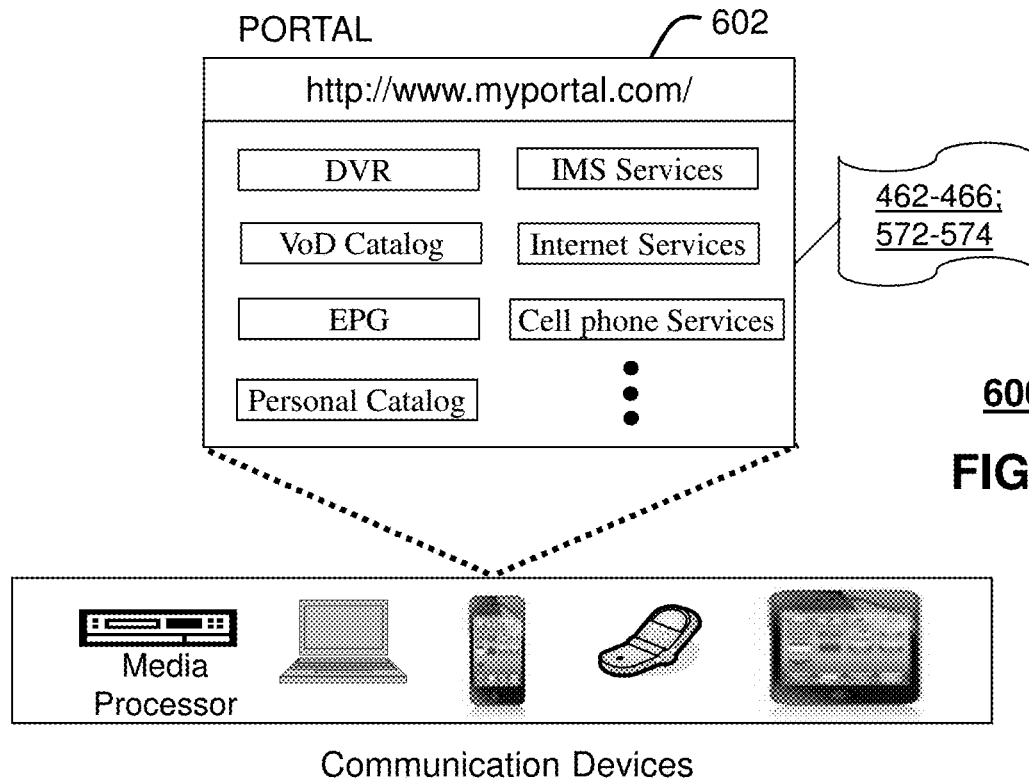
FIG. 6 depicts an illustrative embodiment of a web portal for interacting with the communication systems of FIGS. 1, 4 and 5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1, and communication systems 400-500. For instance, users of the services provided by the ad request enhancement server 130 or server 430 can log into their on-line accounts and provision the ad request enhancement server 130 or server 430 with user profiles, provide contact information to server to enable it to communication with devices described in FIGS. 1-5, and so on. Service providers can log onto an administrator account to provision, monitor and/or maintain the system 100 of FIG. 1 or server 430.

Figure 7:
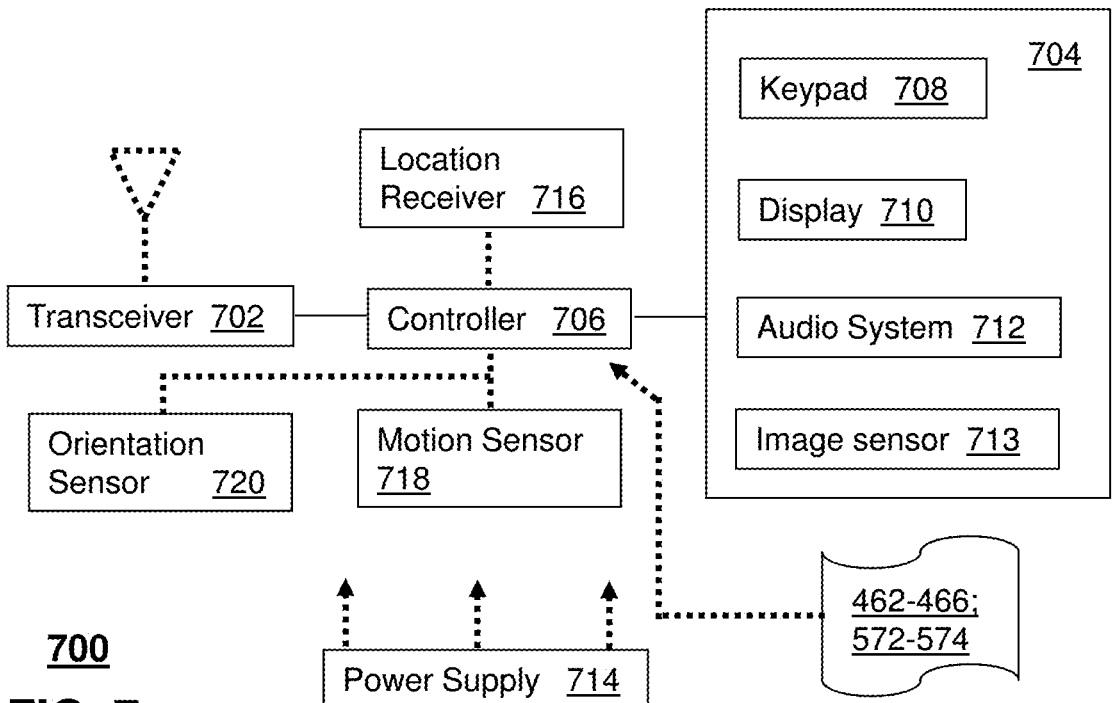
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1, and FIGS. 4-5 and can be configured to perform portions of method 100 of FIGS. 2-3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the device of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system of FIG. 1, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
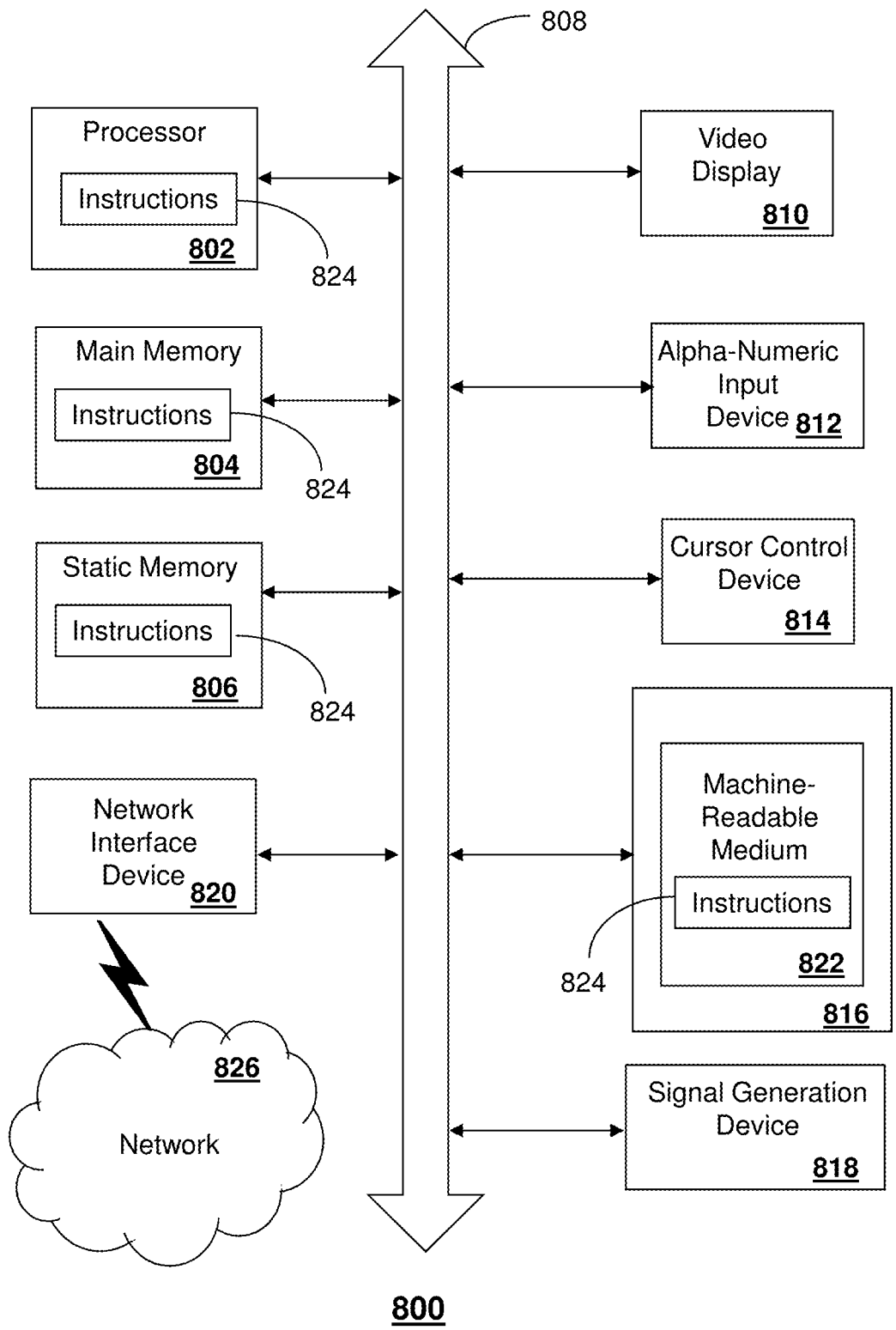
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the ad request enhancement server 130, the media processor 106, the mobile device 116, the media processor 106, the computer device 118, and/or other devices of FIG. 1. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server device, comprising:
a processing system; and
a memory that stores executable instructions, wherein the processing system, on executing the instructions, performs each of a set of operations comprising: [aa]
monitoring for an advertising request message from a mobile device associated with a service provider network of a service provider;
intercepting the advertising request message, wherein the advertising request message is generated by an application executing on the mobile device, wherein the advertising request message is directed to an advertising exchange server, wherein the advertising exchange server is in communication with the service provider via a communication network, wherein the server device is separate from and in communication with the service provider network and the communication network, wherein the advertising request message includes an identifier of the advertising exchange server, and wherein the advertising request message is received by the server device and not by the advertising exchange server;
identifying the advertising exchange server according to the advertising request message; determining whether the advertising exchange server has a first permission from the service provider to receive enhanced information associated with the mobile device;
responsive to determining that the advertising exchange server has the first permission to receive the enhanced information, determining from a subscriber profile of a subscriber associated with the mobile device whether the service provider has a second permission from the subscriber for providing the enhanced information, wherein the service provider is determined not to have the second permission unless a subscriber opt-in procedure is performed in which an identifier of the mobile device is caused to be included in an opt-in list;
responsive to determining that the service provider has the second permission, modifying the advertising request message at least by;
determining a partnership level for the service provider and the advertising exchange server, the partnership level being one of three partnership levels comprising a first partnership level wherein the enhanced information comprises location information associated with the mobile device, a second partnership level wherein the enhanced information comprises demographic information associated with the subscriber, and a third partnership level wherein the enhanced information comprises both the location information and the demographic information;
accessing the enhanced information;
encrypting the enhanced information to generate encrypted enhanced information; and appending the encrypted enhanced information to a header of the advertising request message, thereby creating a modified advertising request message; and transmitting the modified advertising request message to the advertising exchange server, wherein the advertising exchange server performs decrypting of the encrypted enhanced information using a rolling encryption key generator and identifies an advertiser to transmit an advertisement to the mobile device, wherein the modified advertising request message causes the an-advertisement to be sent from equipment of the an-advertiser to the mobile device over the service provider network, wherein the advertisement is not sent via the server device.

2. The server device of claim 1, wherein the operations further comprise:
  determining from the subscriber profile associated with the mobile device whether the service provider has a third permission from the subscriber for providing subscriber information associated with the mobile device; and
  responsive to determining that the service provider has the third permission, accessing the subscriber information associated with the mobile device, wherein the enhanced information is further encrypted with the subscriber information to generate the encrypted enhanced information.

3. The server device of claim 2, wherein the subscriber information comprises an indicator of internet searching history associated with the mobile device.

4. The server device of claim 2, wherein the subscriber information comprises an indicator of prior location information history associated with the mobile device, wherein the prior location information history comprises information regarding how long the mobile device has been communicating with the service provider network, a direction or vector for the mobile device, or a combination thereof.

5. The server device of claim 1, wherein the advertising exchange server is identified according to a uniform resource locator that is included in the advertising request message, and wherein the operations further comprise comparing the uniform resource locator to a database of advertising partners that are associated with the service provider.

6. The server device of claim 1, wherein the operations further comprise determining whether a subscriber that is associated with the subscriber profile associated with the mobile device has opted into providing the second permission to the service provider for providing the location information.

7. The server device of claim 1, wherein the determining whether the service provider has the second permission for providing location is further performed by determining whether a subscriber that is associated with the subscriber profile has opted into an agreement to provide the second permission.

8. The server device of claim 1, wherein the determining whether the service provider has the second permission for providing location is further performed by determining whether a subscriber that is associated with the subscriber profile has not opted out of an agreement to provide the second permission.

9. The server device of claim 1, wherein the operations further comprise receiving geographic location information associated with a cellular base station having a communication with the mobile device, wherein the encrypting of the location information further comprises encrypting the geographic location information to generate the encrypted enhanced information.

10. The server device of claim 1, wherein the operations further comprise receiving cellular base station identifier information associated with a cellular base station having a communication with the mobile device, wherein the encrypting of the enhanced information further comprises encrypting the cellular base station identifier information to generate the encrypted enhanced information.

11. The server device of claim 10, wherein the advertising exchange server determines geographic location information associated with the cellular base station by accessing a database associated with the service provider according to the encrypted enhanced information.

12. The server device of claim 1, wherein the encrypted enhanced information is accessed at the header of the advertising request message that is transmitted.

13. The server device of claim 12, wherein the processing system comprises a plurality of processors operating in a distributed processing environment.

14. A non-transitory, machine-readable storage medium, comprising executable instructions, wherein a processing system of a server device, on executing the instructions, performs each of a set of operations comprising:
  monitoring for an advertising request message from a mobile device;
  intercepting the advertising request message, wherein the advertising request message is generated by an application executing on the mobile device, wherein the advertising request message is directed to an advertising exchange server, wherein the advertising exchange server is in communication with a service provider via a communication network, wherein the server device is separate from and in communication with a service provider network and the communication network, wherein the advertising request message includes an identifier of the advertising exchange server, and wherein the advertising request message is received by the server device and not by the advertising exchange server;
  determining whether the advertising exchange server associated with the advertising request message is permitted to receive enhanced information from a service provider associated with the mobile device;
  responsive to determining that the advertising exchange server is permitted to receive the enhanced information, determining whether the service provider is permitted by a subscriber associated with the mobile device to provide the enhanced information, wherein the service provider is determined to be not permitted to provide the enhanced information unless a subscriber opt-in procedure is performed in which an identifier of the mobile device is caused to be included in an opt-in list; and
  responsive to determining that the service provider is permitted to provide the enhanced information, modifying the advertising request message at least by:
    determining a partnership level for the service provider and the advertising exchange server, the partnership level being one of three partnership levels comprising a first partnership level wherein the enhanced information comprises location information associated with the mobile device, a second partnership level wherein the enhanced information comprises demographic information associated with the subscriber, and a third partnership level wherein the enhanced information comprises both the location information and the demographic information;
    accessing the enhanced information;
    encrypting the enhanced information resulting in encrypted enhanced information; and appending the encrypted enhanced information to a header of the advertising request message, thereby creating a modified advertising request message; and transmitting the modified advertising request message to the advertising exchange server, wherein the advertising exchange server performs decrypting of the encrypted enhanced information using a rolling encryption key generator and identifies an advertiser to transmit an advertisement to the mobile device, wherein the modified advertising request message causes the advertisement to be sent from equipment of the advertiser to the mobile device over the service provider network, wherein the advertisement is not sent via the server device.

15. The non-transitory, machine-readable storage medium of claim 14, wherein the processing system comprises a plurality of processors operating in a distributed processing environment.

16. The non-transitory, machine-readable storage medium of claim 14, wherein the operations further comprise:

determining from a subscriber profile associated with the mobile device whether the service provider is permitted to provide subscriber information associated with the mobile device; and responsive to determining that the service provider is permitted to provide the subscriber information:

accessing the subscriber information associated with the mobile device; and appending the subscriber information to the header of the advertising request message.

17. The non-transitory, machine-readable storage medium of claim 16, wherein the subscriber information comprises an indicator of internet searching history associated with the mobile device, prior location information history associated with the mobile device, or any combination thereof.

18. The non-transitory, machine-readable storage medium of claim 16, wherein the operations further comprise determining whether a subscriber that is associated with the subscriber profile associated with the mobile device has opted into permitting the service provider to provide the location information.

19. A method, comprising:

monitoring, by a processing system of a server device comprising a processor, for an advertising request message from a mobile device, the mobile device communicating with the processing system over a service provider network of a service provider;

intercepting, by the processing system, the advertising request message, wherein the advertising request message is generated by an application executing on the mobile device, wherein the advertising request message is directed to an advertising exchange server, wherein the advertising exchange server is in communication with the service provider via a communication network, wherein the processing system is separate from and in communication with the service provider network and the communication network, wherein the advertising request message includes an identifier of the advertising exchange server, and wherein the advertising request message is received by the processing system and not by the advertising exchange server;

determining, by the processing system, that the advertising exchange server associated with the advertising request message is permitted to receive enhanced information associated with the mobile device;

determining, by the processing system, that the service provider is permitted by a subscriber to provide the enhanced information responsive to determining that the advertising exchange server associated with the advertising request message is permitted to receive the enhanced information, wherein the service provider is determined to be not permitted to provide the enhanced information unless a subscriber opt-in procedure is performed in which an identifier of the mobile device is caused to be included in an opt-in list;

responsive to determining that the service provider is permitted to provide the enhanced information:

determining, by the processing system, a partnership level for the service provider and the advertising exchange server, the partnership level being one of three partnership levels comprising a first partnership level, a second partnership level and a third partnership level, wherein the enhanced information comprises location information associated with the mobile device in accordance with the first partnership level, demographic information associated with the subscriber in accordance with the second partnership level, and both the location information and the demographic information in accordance with the third partnership level;

encrypting, by the processing system, the enhanced information to generate encrypted enhanced information;

adding, by the processing system, the encrypted enhanced information to a header of the advertising request message, thereby creating a modified advertising request message; and transmitting, by the processing system, the modified advertising request message to the advertising exchange server, wherein the advertising exchange server performs decrypting of the encrypted enhanced information using a rolling encryption key generator and identifies an advertiser to transmit an advertisement to the mobile device, wherein the modified advertising request message causes the advertisement to be sent from equipment of the advertiser to the mobile device over the service provider network, wherein the advertisement is not sent via the server device.

20. The method of claim 19, wherein the processing system comprises a plurality of processors operating in a distributed processing environment.

* * * * *

UNITED STATES PATENT AND TRADEMARK OFFICE
CERTIFICATE OF CORRECTION

PATENT NO. : 10,825,054 B2
APPLICATION NO. : 15/088886
DATED : November 3, 2020
INVENTOR(S) : Mark Austin et al.

Page 1 of 1

It is certified that error appears in the above-identified patent and that said Letters Patent is hereby corrected as shown below:

In the Claims

In Claim 1, Column 20, Line 15, please delete "forms each of a set of operations comprising: [aa]" and insert -- forms each of a set of operations comprising: --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*